United States Patent [19]

Waters

[11] Patent Number: 4,521,006
[45] Date of Patent: Jun. 4, 1985

[54] REMOVABLE FENCE FOR TABLE SAW

[76] Inventor: Deryl P. Waters, 4525 NE. 37th, Portland, Oreg. 97211

[21] Appl. No.: 460,619

[22] Filed: Jan. 24, 1983

[51] Int. Cl.³ ............................................. B23Q 3/02
[52] U.S. Cl. .................................... 269/304; 83/438; 83/468; 269/307; 269/315
[58] Field of Search .............. 269/303, 304, 315, 307; 83/467 R, 467 A, 468, 207, 268, 438; 33/444

[56] References Cited

U.S. PATENT DOCUMENTS

| | | | |
|---|---|---|---|
| 316,538 | 4/1885 | Goodwin | 33/444 |
| 533,387 | 1/1895 | Vielhaber | 33/444 |
| 607,814 | 7/1898 | Aigner | 33/444 |
| 1,482,606 | 5/1924 | Goldrick | 33/444 X |
| 2,166,703 | 7/1939 | Boice | |
| 2,265,335 | 12/1941 | Aumann | 83/438 |
| 2,325,082 | 7/1943 | Tautz | |
| 2,556,548 | 6/1951 | Modderman | |
| 2,805,479 | 9/1957 | Droste | |
| 3,656,390 | 4/1972 | Hochstatter | 83/468 |
| 4,206,910 | 6/1980 | Biesemeyer | 83/438 X |

Primary Examiner—Frederick R. Schmidt
Assistant Examiner—Steven P. Schad
Attorney, Agent, or Firm—Chernoff, Vilhauer, McClung, Birdwell & Stenzel

[57] ABSTRACT

A removable fence for a table saw is positioned on a saw table by a locking mechanism located on the fence which simultaneously grips a pair of blocks mounted on an endless flexible cable. The locking mechanism engages the blocks and raises them into frictional relation with an L-bracket mounted on the table thus preventing movement of the fence. The blocks are affixed to the cable at points equidistant from the plane of the saw blade thereby insuring parallelism of the fence relative to the plane of the saw blade. Utilizing the flexibility of the cable which permits lateral movement, the fence is removed by releasing the locking mechanism and moving the blocks laterally away from the mechanism.

13 Claims, 5 Drawing Figures

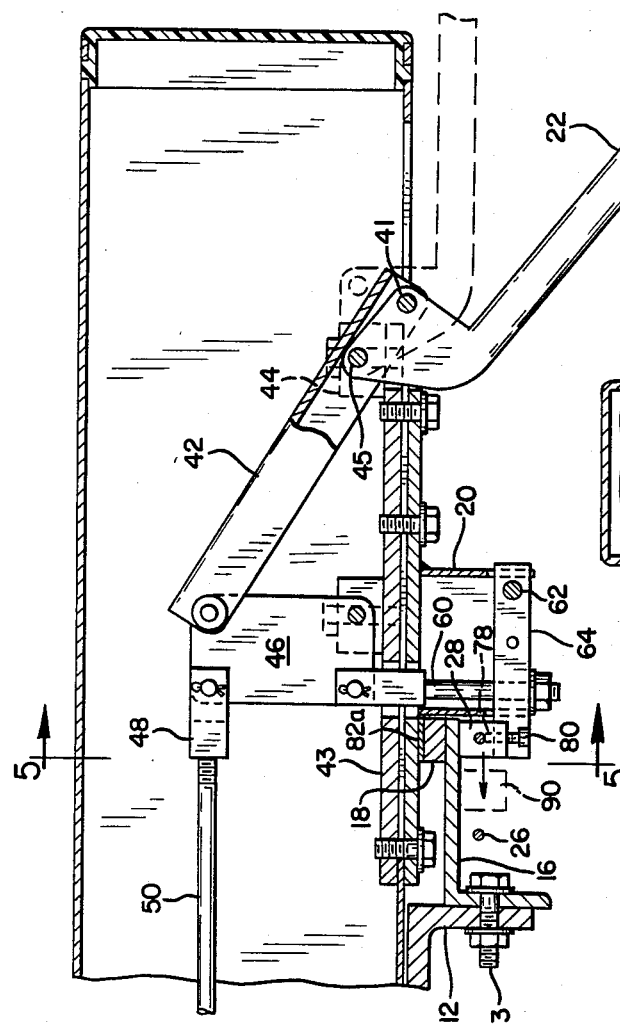
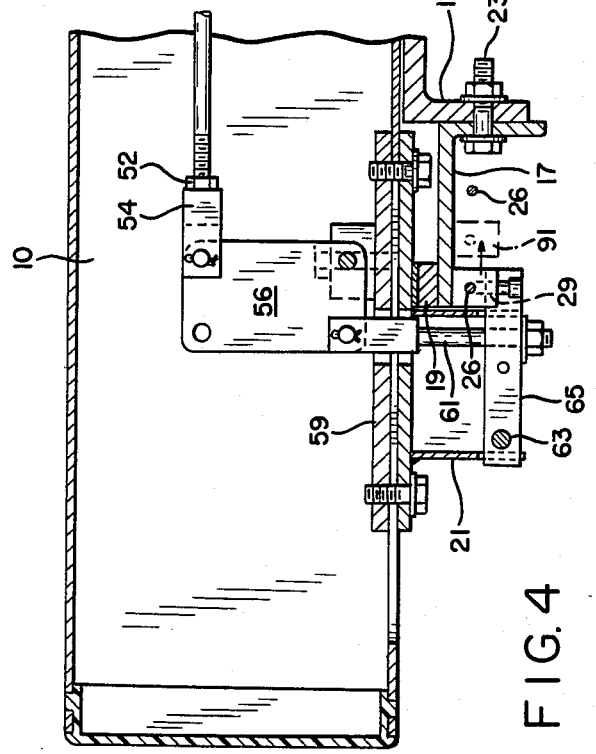
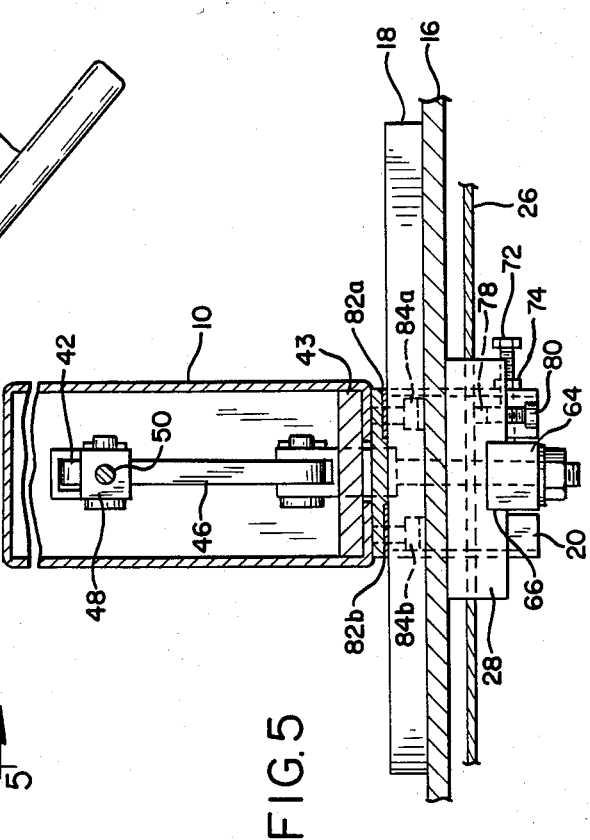
FIG. 4
FIG. 5

REMOVABLE FENCE FOR TABLE SAW

BACKGROUND OF THE INVENTION

The present invention relates to a table saw system, and more particularly to a fence for use with such systems for maintaining parallelism in objects to be cut when moved relative to a planar saw blade.

It is necessary in such systems to keep the fence parallel to the plane of the saw blade to insure the straightness of cuts and the avoidance of oblique angles. Even minor variations in such parallelism can lead to an unacceptable degree of error in cutting wood to be used for various carpentry applications. The problem is magnified if one attempts to remove the fence, for example, to cut a large piece of plywood or fiberboard, and then replace the fence to resume the cutting of smaller pieces. Some systems do provide for the removal and replacement of the fence, but suffer a loss of parallelism in the process. Others maintain parallelism but are difficult to remove and reinstall.

For example, the U.S. Pat. No. 2,166,703 to Boice shows a removable fence for a table saw system. The fence, however, is removed only by unscrewing small attaching parts such as nuts and bolts which can easily be lost. Other devices are easily removable but maintain parallelism by use of the "T square" principle. According to this type of device, parallelism is maintained by exerting pressure on a rail located parallel to the edge of the table. The fence is mounted on a member that slides along the rail and is arranged to be perpendicular to the member. The theory of this device is that once the member exerts pressure against the rail, as by gripping it with a cam and lever arrangement, the fence must be parallel to the saw blade since it is mounted perpendicular to the member. Examples of such systems are shown in the U.S. patents to Tautz, No. 2,235,082, Beisemeyer, No. 4,206,910, and Modderman, No. 2,556,548. These systems, however, all suffer from a common defect known as "cocking." Cocking is the natural tendency of the side of the fence opposite the gripping mechanism to drift slightly out of parallelism when gripping force is applied. Cocking results from the fact that a gripping force applied in a direction substantially parallel to the fence will, in fact, have small non-parallel components. Cocking even occurs in mechanisms adapted for simultaneous gripping on both sides of the fence such as the Modderman '548 patent, mentioned above.

Cocking, however, can be eliminated by using a flexible cable system in which these non-parallel force components on the cable are transmitted in the same longitudinal direction due to the manner in which the cable is strung. Drawing table arrangements have, in the past, used continuous loop cables mounted about the periphery of the table to which a straight edge can be attached. Examples of such systems are shown in the U.S. patents to Goodwin, No. 316,538, Vielhaber, No. 533,387, and Droste, No. 2,805,479. Vielhaber and Goodwin show what will be referred to herein as a continuous loop cable system. In systems of this type, a continuous strand of cable is mounted on pulleys arranged in a U-shaped fashion about the periphery of the drawing table. The pulleys are arranged such that the outer strands of the cable on opposite sides of the table are parallel and move in the same longitudinal direction upon movement of the straight edge which is attached thereto. Another example of this type of system is shown in the U.S. patent to Hochstatter, No. 3,656,390, in which a fence mounted on a continuous loop cable system is positionally adjusted by bringing a lever into abutment with a series of stops located at the front of the table. The fence, however, is not removable from the cable except by unfastening bolts which hold the fence to a cable-gripping slide and runner arrangement. Since any device used to grip the cable will necessarily impart at least a small force component running longitudinally with the cable, that is along its axial line, this force, exerted on a cable on one side of the table, will be transmitted via the cable itself to the other side, and in the same direction. Thus, no cocking occurs. This principle also permits the straight edge to be moved along the table while fastened to the cable system without losing parallelism. A variation of this concept is shown in the Droste '479 patent in which two endless loop cables are attached on opposite sides of the table to pulleys interconnected by a drive shaft connecting two of the pulleys. Any force on one set of cables is transmitted to the other via the drive shaft.

In these systems the straight edge can be set for parallelism, however, once set, cannot be removed without considerable difficulty in repositioning the straight edge. Once the straight edge is removed, parallelism is lost and a user must realign the straight edge to the table when he wishes to replace it. Moreover, in these systems, the straight edge is held in parallel relation to the table by gripping the wire or cable at various points. This gripping and loosening of the cable by locking nuts or pins leads to unacceptable depressions and stress points in the cable and makes it harder to continuously readjust the fence when the cable becomes well used. Also, such straight edge systems are not designed to hold the straight edge in rigid relation to the table. If the only connection between the straight edge and the table is the gripping of the wire by the straight edge or some device connected to it, the straight edge will lack the rigidity necessary in a table saw where considerable amounts of force are placed on the fence when guiding objects along it to be cut by the saw.

SUMMARY OF THE INVENTION

The present invention overcomes these and other difficulties by providing a fence which is removable and replaceable without the unscrewing or removal of small attaching parts which can be easily lost, yet firmly maintains parallelism with the saw blade without cocking and without the necessity of squeezing or clamping a cable at a multiplicity of points with repeated repositioning. A pair of blocks or engagement members are mounted in fixed relationship to the plane of the saw blade on a cable or flexible elongate member of either the single continuous loop type or the interconnected dual loop type. The blocks are located on opposite sides of the table at points equidistant from the plane of the saw blade along respective cable strands running longitudinally of the table. Thus, the fence, when locked to these blocks will always be parallel to the plane of the saw blade. A handle-actuated locking mechanism is provided on the fence for releasing the blocks, thus providing easy removal and replacement. Since the blocks are affixed to flexible cables, removal is effected by laterally moving the blocks away from and under the locking mechanism upon release, and, sliding the fence off of the end of the table.

The locking mechanism grips the blocks by forcing them upwards against an L-shaped bracket bolted to and forming an extension of the table such that the members are held in gripping or frictional relation with the bracket, and hence, the table. This friction prevents any movement of the fence. The locking mechanism comprises levers at both ends of the fence adapted to lift upwards and mate with slots on the blocks. Since the blocks are mounted on flexible cable, disengagement is effected by lowering the locking levers and moving the blocks laterally, that is in directions substantially perpendicular to the longitudinal direction of the cable, away from and then under the levers. Once disengagement has been affected in this manner, the fence is simply slid off of the end of the table.

Thus, the invention makes use of the locking of the fence to blocks which are known to be affixed to the cable at points equidistant from the plane of the saw blade, and parallelism is insured. Because the cable is strung to move in the same direction on opposite sides of the table due to the particular interconnection used, any longitudinally directed forces applied to a block on one side are simply transmitted to the other block via the cable so as to act in the same direction.

The locking mechanism will become worn with age and thus develop a certain amount of looseness in the levers due to repeated actuation and release of the handle. The invention, therefore, also provides an adjustment located on the underside of the fence to compensate for such wear.

The invention also provides for continuously monitoring the position of the fence by use of a track and sensing mechanism in which the sensing mechanism is mounted to the inner strand of one of the cable pairs.

It is therefore an object of this invention to provide a fence for a table saw having a high degree of accuracy in maintaining parallelism with the plane of the saw blade.

It is a further object of this invention to provide a table saw having a fence which is easily removed and replaced without losing parallelism.

It is a further object of this invention to provide a device for continuously adjusting the locking mechanism of a removable fence to compensate for wear.

It is a further object of this invention to provide a removable fence having an accurate sensing means for continuously determining the position of the fence relative to the saw blade.

BRIEF DESCRIPTION OF THE DRAWINGS

Reference is hereby made to the drawings in which:

FIG. 4 is an extended partial sectional front elevation view taken along line 4—4 of FIG. 1; and FIG. 5 is a sectional view taken along line 5—5 of FIG. 4.

DETAILED DESCRIPTION OF THE INVENTION

Figure 1:
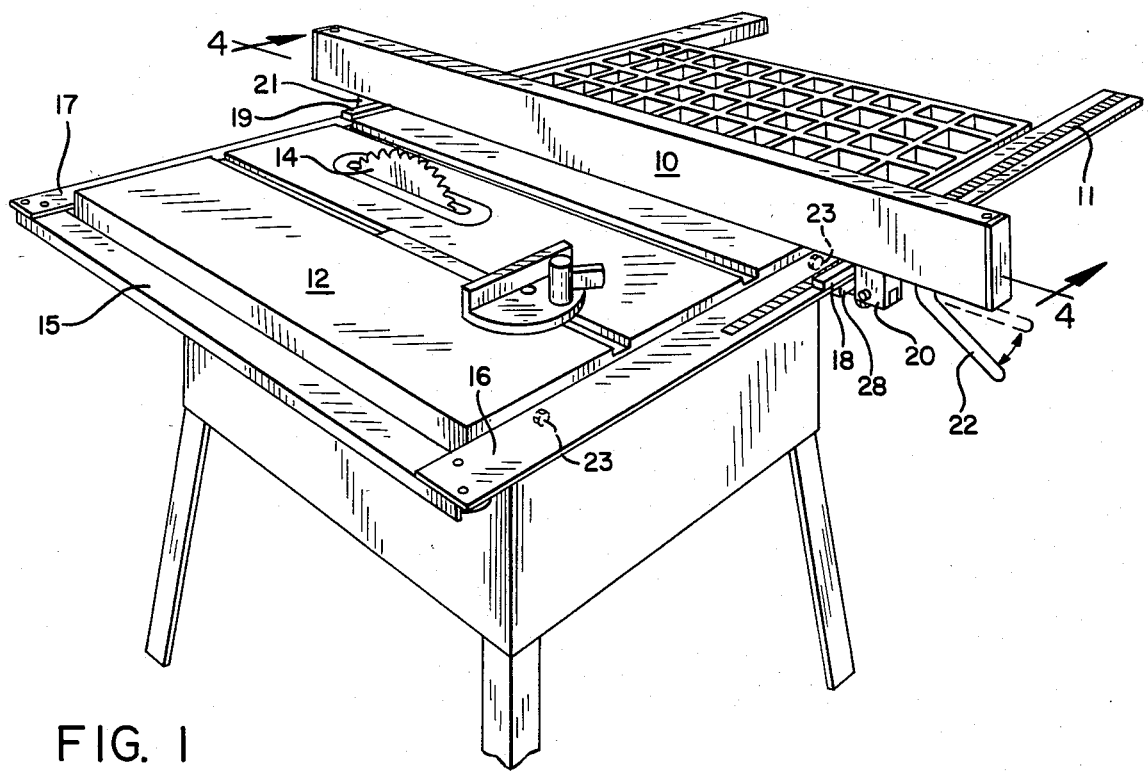
FIG. 1 is a perspective view of a table saw system employing the present invention.

Referring now to FIG. 1, a saw 14 is mounted in a table 12 in the conventional manner in which the saw blade is perpendicular to the plane of the table. An elongate fence 10 for guiding objects to be cut along a line parallel to the plane of the saw blade glides over the top of L-shaped brackets 16 and 17 which are fastened by bolts 23 to the table and connected to each other at one end of the table by cable guide 15. The fence rests upon a pair of bars 18 and 19 located on opposite sides which slide along the upper surface of brackets 16 and 17 to support the fence 10 slightly above the table 12. The fence further comprises housings 20 on each end thereof to support a locking mechanism actuated by handle 22. A ruler 11 may also be provided for measuring the distance between the fence and the saw blade 14.

Figure 2:
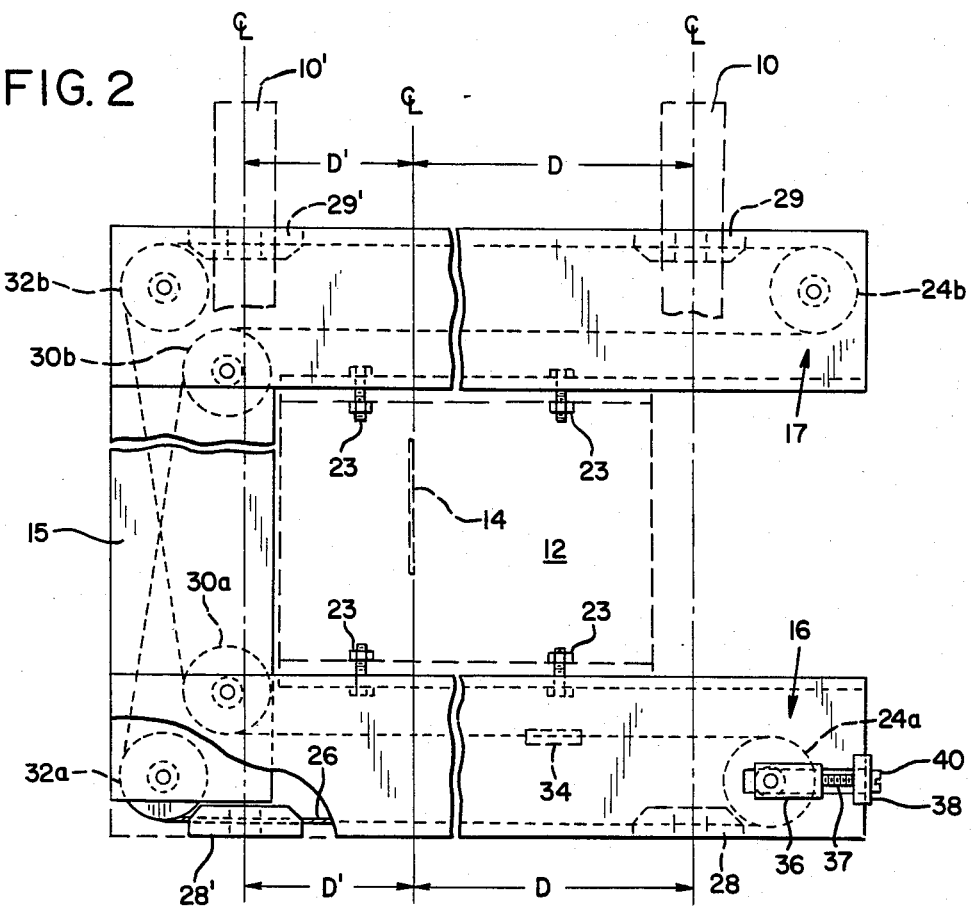
FIG. 2 is an extended top schematic plan view of the system of FIG. 1 with the fence shown in two different positions.

FIG. 2 shows a schematic top view of the invention with the fence and its accompanying cable blocks shown in two positions. To move the fence between various longitudinal positions a single continuous loop cable system is provided. This cable and pulley system is substantially of the type illustrated in the Goodwin and Vielhaber patents in which the strands are adapted for continuous unitary movement, the outer strands on opposite sides of the table moving in the same longitudinal direction, and the inner strands moving reciprocally in the opposite direction. An endless loop of cable 26 is strung over pulleys 24a and 24b bolted to brackets 16 and 17, respectively, thence to inner pulleys 30a and 30b, and outer pulleys 32a and 32b. Pulleys 30a and 30b and 32a and 32b are also mounted on cable guide 15. Since the pulley and cable arrangement is mounted entirely on brackets 16 and 17 and cable guide 15, it may be connected to any existing table saw as a retrofit system by bolts 23. Affixed to the cable 26, which can be any flexible elongate member, are blocks or other suitable engagement members 28 and 29. The function of the blocks 28 and 29 is to provide members capable of the positioning of and/or the engagement by the fence, and thus the blocks may be of any particular construction. The preferred construction however, as shown in FIG. 2, is a chamfered block to provide maximum movement of the fence. Block 28 is slideably mounted on cable 26 through a bore, and can thus be adjusted to any desired location on the cable. Block 29 forms the connecting link between the ends of cable 26. Mounted to the inner strand of the cable on one side of table 12 is a sensor 34, preferably of the light-responsive type which will be explained further herein.

The cable may be adjusted for any desired degree of tension by loosening or tightening set screw 40. Set screw 40 is held by retainer bracket 38 and threadingly engages guide block 36 which moves through a slot 37 in L-bracket 16. Pulley 24a is bolted to guide block 36. The tension of cable 26 is thus adjustable to provide for lateral movement of blocks 28 and 29; that is, in a direction substantially perpendicular to the longitudinally extending cable strands. It is this lateral movement of blocks 28 and 29 which permits them to engage and disengage with the fence 10 so it can be easily removed upon release of the locking mechanism.

Figure 3:
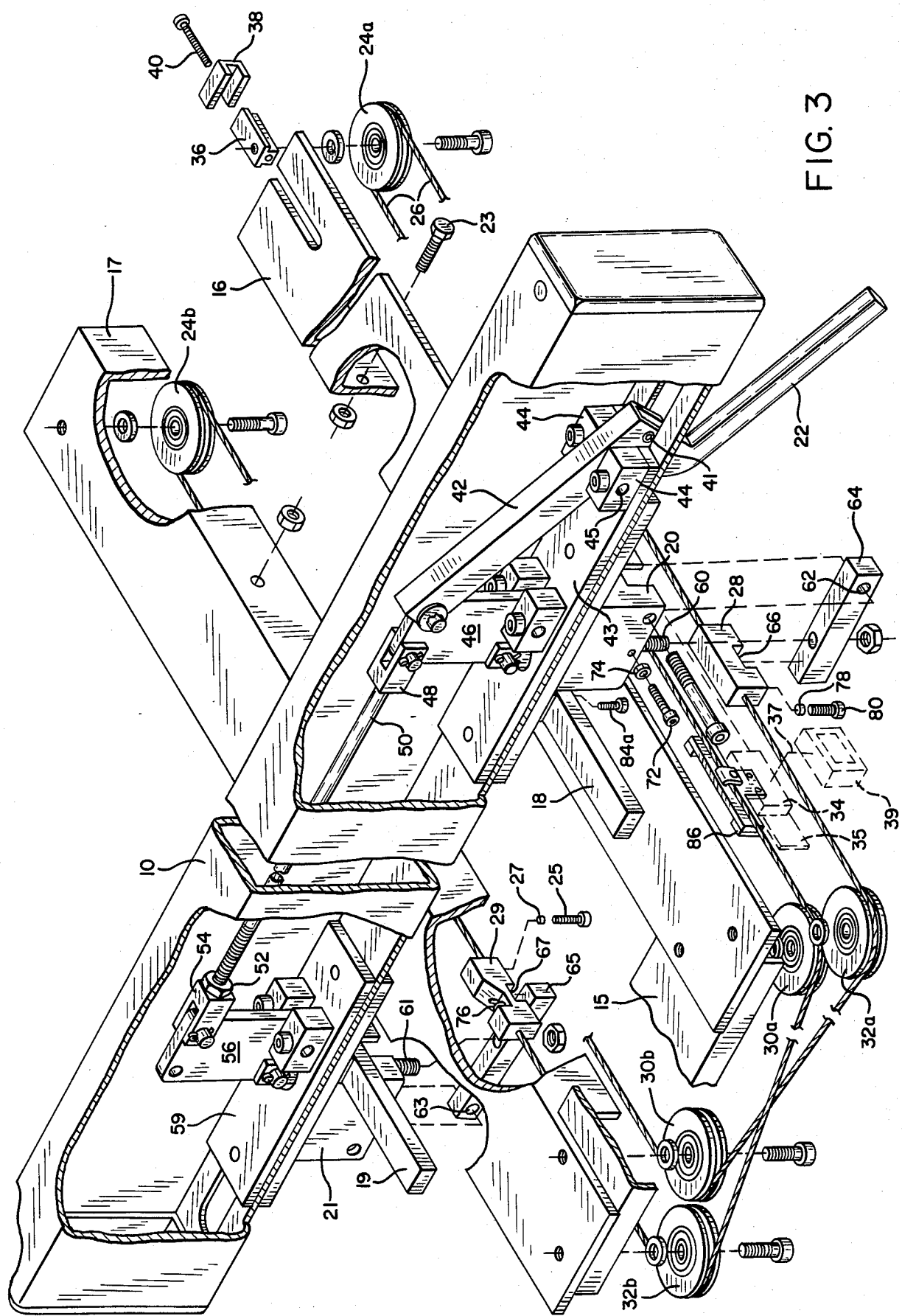
FIG. 3 is an extended partial exploded isometric view of the fence and cable system embodying a part of the invention.

The locking mechanism is shown in more detail in FIGS. 3, 4 and 5. At one end of fence 10, handle 22 is connected to an overcenter link 42 at a point 41. Handle 22 is also pivotally connected to a base 43 mounted inside fence 10 at a point 45 between a pair of pillow blocks 44. The other end of overcenter link 42 is pivotally connected to a bell crank 46 which is, in turn, pivotally connected to the fence at base 43. Attached to the upper end of bell crank 46 is a yoke 48 which threadingly engages a rod 50. The other end of rod 50 is connected to a similar yoke 54 and held in place by a lock nut 52. Yoke 54 is connected to a second bell crank 56 at the opposite end of fence 10. Bell crank 56 is, in turn, pivotally connected to fence 10 at base 59 which is similar to base 43. Bell cranks 46 and 56 are utilized to actuate levers 64 and 65 respectively. The levers are used to position the fence relative to the saw blade by fitting into slots 66 and 67 in blocks 28 and 29, respectively. As will be described herein, after positioning, the blocks are locked into frictional relation with the table. Levers 64 and 65 are connected to bell cranks 46 and 56 via links 60 and 61, respectively. The levers are also pivotally connected at points 62 and 63 to housings 20 and 21, respectively, which are affixed to the underside of opposite ends of fence 10.

In actual operation, the fence is slid onto the table and into position near the location of blocks 28 and 29. Since the blocks are mounted on cable which is tensioned for some degree of lateral movement, the fence is positioned and removed by moving the blocks laterally to engage and release the positioning levers 64 and 65 as shown by the phantom lines and arrows 90 and 91, respectively, in FIG. 4. In actual practice it will be necessary to slip the blocks underneath the levers, but all movement of the blocks to effect engagement and disengagement will be in directions normal to the longitudinal direction of cable 26. Blocks 28 and 29 have slots 66 and 67 for receipt of levers 64 and 65. After positioning the levers to engage the blocks all that remains is to lock the fence in place. To lock fence 10, handle 22 is moved in a downward direction to raise the levers 64 and 65. The motion of the handle simultaneously lifts the levers, by virtue of the overcenter connection between handle 22 and bell crank 46, thereby forcing the blocks upwardly against the underside of brackets 16 and 17. Since these brackets are bolted to the table, the blocks are thereby held in gripping or frictional relation with the table.

With repeated usage the pivot points 62 and 63 between levers 64 and 65 and housings 20 and 21 will become worn. To that end, provision is made for adjusting the respective connections between housings 20 and 21 and levers 64 and 65. An adjusting screw 72 is threaded through a hole in housing 20. The adjusting screw continuously presses against lever 64, forcing the lever against the side of the housing. The adjustment is maintained by lock nut 74. A similar provision (not shown) may be made for housing 21 and lever 65.

It can be appreciated that as long as blocks 28 and 29 are connected to cable at respective points equidistant from the plane of the saw blade, the fence, having been positioned by engaging the blocks at slots 66 and 67 with levers 64 and 65, will be parallel with the plane of the saw blade. This principle is illustrated in FIG. 2 which shows a center line generally indicating the plane of the saw blade 14 and center lines indicating the points at which blocks 28 and 29 are attached to cable 26. For illustration, fence 10 is shown in two positions, at distances D and D' from the plane of saw blade 14. As long as the blocks are affixed to the cable in this manner, the fence will always be parallel to the plane of saw blade 14, and consequently, the fence may be removed from and reconnected to blocks 28 and 29 without destroying its parallelism with the saw blade.

Block 29 forms the connecting link between the two ends of cable 26 in which one end is inserted through a bore and prevented from passing back out of the bore by a stopper swaged onto the cable, so as to lie in a notch in the upper portion of block 29 as shown generally at 76. The other end of cable 26 is affixed to block 29 by a screw 25 and plastic plug 27. Thus, once cable system 26 is assembled, block 29 remains fixed relative thereto. Block 28 is slidably mounted on cable 26 and may be adjusted for attachment at a point the same distance from the plane of the saw blade as block 29. Block 28 is held at a desired location on cable 26 by the use of a screw 80 and plastic plug 78 similar to screw 25 and plug 27. The plastic plugs exert pressure on cable 26 without permanently deforming or causing depressions in the cable.

The fence may also be adjusted for verticality by shims interposed on opposite sides of the fence between bars 18 and 19 and the underside of fence 10. The shims are held in place by screws. FIG. 5 shows one pair of shims 82a and 82b held by screws 84a and 84b. A similar arrangement may be made at the opposite end of fence 10.

Provision is also made for continuously monitoring the position of the fence relative to the saw blade, and to that end an optical or mechanical sensor 34 is provided which is attached to a bracket 86 mounted on the inner strand of cable 26. Sensor 34 is arranged to cooperate with a graduated optical or mechanical index 35 of any conventional type affixed to the bracket 16. Such devices are well known in the art as, for example, a model 500G Glass Scale Spar marketed by Tri-onics, Inc., of Highland, Ill. Appropriate electrical connections 37 may attach the sensor to a suitable microprocessor and digital readout 39. Since the inner strand of cable 26 moves in a direction opposite to the outer strands, the sensing system is calibrated for this reciprocal movement of the cable's strands.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a table saw system having a table and an elongate fence having two ends for maintaining parallelism of objects to be cut relative to a planar saw blade, the combination comprising:
   (a) at least two flexible elongate members extending substantially parallel to each other on opposite sides of the table and interconnected for movement in unison in a direction substantially perpendicular to the plane of the sawblade, saw members having respective engagement means affixed thereto at respective points equidistant from the plane of said sawblade for positioning said fence parallel to said sawblade, said flexible elongate members being movable transversely toward and away from said table, and said engagement means being movable into and out of abutment with said table by movement in unison with said flexible elongate members toward and away from said table; and
   (b) locking means mounted on said fence for selectively moving said engagement means into and out of abutment with said table by said movement in unison with said flexible elongate members and thereby selectively holding each of said engagement means in frictional abutment with said table to prevent said fence from moving relative thereto when said locking means is in a locked position and for permitting movement of said fence along said table when said locking means is in an unlocked position.

2. The combination as claimed in claim 1 in which the flexible elongate members are strands of a single continuous loop having a pair of strands on each of said opposite sides of the table occupying inner and outer postions, respectively, relative to the table.

3. The combination as claimed in claim 2 wherein the engagement means are mounted to the respective outer strands of said single continuous loop.

4. The combination as claimed in claim 1 in which the locking means comprises respective interconnected means located at opposite ends of said fence for simultaneously selectively holding said engagement means in gripping relation with said table.

5. The combination as claimed in claim 4 wherein said locking means has a single handle located at one end of said fence and adapted for overcenter movement with respect to said interconnected means for selectively actuating said interconnected means.

6. The combination as claimed in claim 5 wherein said locking means further comprises a pair of bell crank assemblies pivotally connected to said fence at opposite ends thereof and connected to each other by an elongate rod, a respective link and lever connected to each of said bell crank assemblies, each of said links being adapted to engage a respective one of said levers so as to force said lever upward against said engagement means to hold said engagement means in frictional engagement with said table upon a predetermined movement of said handle.

7. The combination as claimed in claim 6 wherein each of said engagement means has a slot adapted to receive said lever.

8. The combination of claim 1 wherein said engagement means are positioned to abut pulleys on respective sides of said table and portions of said locking means simultaneously when said fence is moved to the end of the table adjacent said pulleys wherein said abutment prevents said fence from slipping off of the end of the table.

9. The combination of claim 8 wherein said engagement means are beveled to permit said means to abut tangentially to said pulleys.

10. The combination of claim 1 wherein said fence is selectively removable.

11. The combination of claim 1 wherein said locking means includes selectively movable portions and wherein said engagement means comprises a pair of blocks disposed one on each side of the table, each respective block having an opening therein for receipt of each respective one of said movable portions of said locking means.

12. The combination of claim 11 wherein said movable portions of said locking means comprise a pair of lever arms for locking said blocks to said table by engaging a slot in each of said blocks, respectively, and by lifting said blocks into frictional abutment with said table.

13. The combination of claim 1 wherein said locking means further includes means for selectively locking said fence to said engagement means by placement of said locking means in said locked position, and for selectively unlocking said fence from said engagement means by placement of said locking means in said unlocked position.

* * * * *